(12) United States Patent
Bultje

(10) Patent No.: US 9,247,251 B1
(45) Date of Patent: Jan. 26, 2016

(54) RIGHT-EDGE EXTENSION FOR QUAD-TREE INTRA-PREDICTION

(71) Applicant: Google Inc., Mountain View, CA (US)

(72) Inventor: Ronald Sebastiaan Bultje, San Jose, CA (US)

(73) Assignee: GOOGLE INC., Mountain View, CA (US)

( * ) Notice: Subject to any disclaimer, the term of this patent is extended or adjusted under 35 U.S.C. 154(b) by 374 days.

(21) Appl. No.: 13/951,930

(22) Filed: Jul. 26, 2013

(51) Int. Cl.
*H04N 7/12* (2006.01)
*H04N 19/593* (2014.01)

(52) U.S. Cl.
CPC .............................. *H04N 19/00763* (2013.01)

(58) Field of Classification Search
None
See application file for complete search history.

(56) References Cited

U.S. PATENT DOCUMENTS

| | | | |
|---|---|---|---|
| 5,150,209 A | 9/1992 | Baker et al. |
| 5,708,473 A | 1/1998 | Mead |
| 5,916,449 A | 6/1999 | Ellwart et al. |
| 5,930,387 A | 7/1999 | Chan et al. |
| 5,956,467 A | 9/1999 | Rabbani et al. |
| 6,005,625 A | 12/1999 | Yokoyama |
| 6,044,166 A | 3/2000 | Bassman et al. |
| 6,058,211 A | 5/2000 | Bormans et al. |
| 6,108,383 A | 8/2000 | Miller et al. |
| 6,243,416 B1 | 6/2001 | Matsushiro et al. |
| 6,314,208 B1 | 11/2001 | Konstantinides et al. |
| 6,473,460 B1 | 10/2002 | Topper |
| 6,532,306 B1 | 3/2003 | Boon et al. |
| 6,611,620 B1 | 8/2003 | Kobayashi et al. |
| 6,654,419 B1 | 11/2003 | Sriram et al. |
| 6,687,304 B1 | 2/2004 | Peng |
| 7,116,830 B2 | 10/2006 | Srinivasan |
| 7,158,681 B2 | 1/2007 | Persiantsev |
| 7,197,070 B1 | 3/2007 | Zhang et al. |
| 7,218,674 B2 | 5/2007 | Kuo |
| 7,236,527 B2 | 6/2007 | Ohira |
| 7,253,831 B2 | 8/2007 | Gu |

(Continued)

FOREIGN PATENT DOCUMENTS

JP    2007267414    10/2007

OTHER PUBLICATIONS

Park, Jun Sung, et al., "Selective Intra Prediction Mode Decision for H.264/AVC Encoders", World Academy of Science, Engineering and Technology 13, (2006).

(Continued)

*Primary Examiner* — Kate Luo
(74) *Attorney, Agent, or Firm* — Young Basile Hanlon & MacFarlane P.C.

(57) ABSTRACT

Encoding and decoding using right-edge extension for quad-tree intra-prediction may include identifying a current frame from the plurality of frames, the current frame including a plurality of blocks, identifying a current block from the plurality of blocks, identifying a proximal reconstructed pixel, wherein the proximal reconstructed pixel is proximally above the current block, identifying a distant reconstructed pixel, wherein the distant reconstructed pixel is a most proximate reconstructed pixel above the proximal reconstructed pixel such that a reconstructed pixel proximally to the right of the distant reconstructed pixel is available for prediction, generating a prediction pixel based on the proximal reconstructed pixel, the distant reconstructed pixel, and the reconstructed pixel proximally to the right of the distant reconstructed pixel, and generating a predicted pixel for the current block based on the prediction pixel.

20 Claims, 11 Drawing Sheets

(56) References Cited

U.S. PATENT DOCUMENTS

| | | | |
|---|---|---|---|
| 7,263,125 B2 | 8/2007 | Lainema | |
| 7,333,544 B2 | 2/2008 | Kim et al. | |
| 7,450,642 B2 | 11/2008 | Youn | |
| 7,466,774 B2 | 12/2008 | Boyce | |
| 7,602,851 B2 | 10/2009 | Lee et al. | |
| 7,689,051 B2 | 3/2010 | Mukerjee | |
| 7,924,918 B2 | 4/2011 | Lelescu et al. | |
| 8,000,546 B2 | 8/2011 | Yang et al. | |
| 8,094,722 B2 | 1/2012 | Wang | |
| 8,111,914 B2 | 2/2012 | Lee et al. | |
| 8,135,064 B2 | 3/2012 | Tasaka et al. | |
| 8,208,545 B2 | 6/2012 | Seo et al. | |
| 8,311,111 B2 | 11/2012 | Xu et al. | |
| 8,320,470 B2 | 11/2012 | Huang et al. | |
| 8,325,796 B2 | 12/2012 | Wilkins et al. | |
| 8,369,402 B2 | 2/2013 | Kobayashi et al. | |
| 8,369,411 B2 | 2/2013 | Au et al. | |
| 8,526,498 B2 | 9/2013 | Lim et al. | |
| 8,559,512 B2 | 10/2013 | Paz | |
| 8,666,181 B2 | 3/2014 | Venkatapuram et al. | |
| 8,711,935 B2 | 4/2014 | Kim et al. | |
| 8,724,702 B1 | 5/2014 | Bulusu et al. | |
| 8,761,242 B2 | 6/2014 | Jeon et al. | |
| 8,885,956 B2 | 11/2014 | Sato | |
| 2002/0017565 A1 | 2/2002 | Ju et al. | |
| 2002/0026639 A1 | 2/2002 | Haneda | |
| 2003/0202705 A1 | 10/2003 | Sun | |
| 2003/0215135 A1 | 11/2003 | Caron et al. | |
| 2004/0001634 A1 | 1/2004 | Mehrotra | |
| 2004/0252886 A1 | 12/2004 | Pan et al. | |
| 2005/0180500 A1 | 8/2005 | Chiang et al. | |
| 2005/0265447 A1 | 12/2005 | Park | |
| 2006/0056689 A1 | 3/2006 | Wittebrood et al. | |
| 2006/0215751 A1 | 9/2006 | Reichel et al. | |
| 2007/0036354 A1 | 2/2007 | Wee et al. | |
| 2007/0080971 A1 | 4/2007 | Sung | |
| 2007/0121100 A1 | 5/2007 | Divo | |
| 2007/0216777 A1 | 9/2007 | Quan et al. | |
| 2007/0217701 A1 | 9/2007 | Liu et al. | |
| 2008/0069440 A1 | 3/2008 | Forutanpour | |
| 2008/0212678 A1 | 9/2008 | Booth et al. | |
| 2008/0239354 A1 | 10/2008 | Usui | |
| 2008/0260042 A1 | 10/2008 | Shah et al. | |
| 2008/0294962 A1 | 11/2008 | Goel | |
| 2008/0310745 A1 | 12/2008 | Ye et al. | |
| 2009/0161763 A1 | 6/2009 | Rossignol et al. | |
| 2009/0196342 A1 | 8/2009 | Divorra Escoda et al. | |
| 2009/0232401 A1 | 9/2009 | Yamashita et al. | |
| 2009/0257492 A1 | 10/2009 | Andersson et al. | |
| 2010/0021009 A1 | 1/2010 | Yao | |
| 2010/0034265 A1 | 2/2010 | Kim et al. | |
| 2010/0034268 A1 | 2/2010 | Kusakabe et al. | |
| 2010/0086028 A1 | 4/2010 | Tanizawa et al. | |
| 2010/0104021 A1 | 4/2010 | Schmit | |
| 2010/0111182 A1 | 5/2010 | Karczewicz et al. | |
| 2010/0118945 A1 | 5/2010 | Wada et al. | |
| 2010/0128796 A1 | 5/2010 | Choudhury | |
| 2010/0195715 A1 | 8/2010 | Liu et al. | |
| 2011/0002541 A1 | 1/2011 | Varekamp | |
| 2011/0026591 A1 | 2/2011 | Bauza et al. | |
| 2011/0033125 A1 | 2/2011 | Shiraishi | |
| 2011/0069890 A1 | 3/2011 | Besley | |
| 2011/0158529 A1 | 6/2011 | Malik | |
| 2011/0176607 A1* | 7/2011 | Kim et al. | 375/240.08 |
| 2011/0211757 A1 | 9/2011 | Kim et al. | |
| 2011/0235706 A1 | 9/2011 | Demircin et al. | |
| 2011/0243229 A1 | 10/2011 | Kim et al. | |
| 2011/0243230 A1 | 10/2011 | Liu | |
| 2011/0249741 A1 | 10/2011 | Zhao et al. | |
| 2011/0255592 A1 | 10/2011 | Sung et al. | |
| 2011/0268359 A1 | 11/2011 | Steinberg et al. | |
| 2011/0293001 A1 | 12/2011 | Lim et al. | |
| 2012/0014436 A1 | 1/2012 | Segall et al. | |
| 2012/0014437 A1 | 1/2012 | Segall et al. | |
| 2012/0014438 A1 | 1/2012 | Segall et al. | |
| 2012/0014439 A1* | 1/2012 | Segall et al. | 375/240.12 |
| 2012/0014440 A1 | 1/2012 | Segall et al. | |
| 2012/0014444 A1* | 1/2012 | Min et al. | 375/240.12 |
| 2012/0020408 A1 | 1/2012 | Chen et al. | |
| 2012/0039388 A1 | 2/2012 | Kim et al. | |
| 2012/0057630 A1 | 3/2012 | Sanena et al. | |
| 2012/0287998 A1* | 11/2012 | Sato | 375/240.12 |
| 2012/0307884 A1 | 12/2012 | MacInnis | |
| 2012/0320975 A1* | 12/2012 | Kim et al. | 375/240.12 |
| 2012/0320984 A1 | 12/2012 | Zhou | |
| 2013/0027230 A1 | 1/2013 | Marpe et al. | |

OTHER PUBLICATIONS

Su M_T Sun University of Washington et al. "Encoder Optimization for H.264/AVC Fidelity Range Extensions" Jul. 12, 2005.

"Series H: Audiovisual and Multimedia Systems; Infrastructure of audiovisual services—Coding of moving video; Advanced video coding for generic audiovisual services". H.264. Version 1. International Telecommunication Union. Dated May, 2003.

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder Specification". Version 1.03. On2 Technologies, Inc. Dated Oct. 29, 2007.

"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.

"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.

"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.

"VP8 Data Format and Decoding Guide". WebM Project. Google On2. Dated: Dec. 1, 2010.

Bankoski et al. "VP8 Data Format and Decoding Guide; draft-bankoski-vp8-bitstream-02" Network Working Group. Dated May 18, 2011.

Bankoski et al. "Technical Overview of VP8, An Open Source Video Codec for the Web". Dated Jul. 11, 2011.

Bankoski, J., Koleszar, J., Quillio, L., Salonen, J., Wilkins, P., and Y. Xu, "VP8 Data Format and Decoding Guide", RFC 6386, Nov. 2011.

Mozilla, "Introduction to Video Coding Part 1: Transform Coding", Video Compression Overview, Mar. 2012, 171 pp.

Han et al., "Jointly Optimized Spatial Prediction and Block Transform for Video and Image Coding," IEEE Transactions on Image Processing, vol. 21, No. 4 (Apr. 2012).

Han et al., "Toward Jointly Optimal Spatial Prediction and Adaptive Transform in Video/Image Coding," ICASSP 2010 (Dallas, TX, Mar. 14-19, 2010).

* cited by examiner

RIGHT-EDGE EXTENSION FOR QUAD-TREE INTRA-PREDICTION

BACKGROUND

Digital video can be used, for example, for remote business meetings via video conferencing, high definition video entertainment, video advertisements, or sharing of user-generated videos. Due to the large amount of data involved in video data, high performance compression is needed for transmission and storage. Accordingly, it would be advantageous to provide high resolution video transmitted over communications channels having limited bandwidth.

SUMMARY

This application relates to encoding and decoding of video stream data for transmission or storage. Disclosed herein are aspects of systems, methods, and apparatuses for encoding and decoding using right-edge extension for quad-tree intra-prediction.

An aspect is a method for performing right-edge extension for quad-tree intra-prediction, which may include identifying a current frame from the plurality of frames, the current frame including a plurality of blocks, identifying a current block from the plurality of blocks, identifying a proximal reconstructed pixel, wherein the proximal reconstructed pixel is proximally above the current block, identifying a distant reconstructed pixel, wherein the distant reconstructed pixel is a most proximate reconstructed pixel above the proximal reconstructed pixel such that a reconstructed pixel proximally to the right of the distant reconstructed pixel is available for prediction, generating a prediction pixel based on the proximal reconstructed pixel, the distant reconstructed pixel, and the reconstructed pixel proximally to the right of the distant reconstructed pixel, and generating a predicted pixel for the current block based on the prediction pixel.

Another aspect is a method for performing right-edge extension for quad-tree intra-prediction. The method may include identifying a current pixel of a current block from a plurality of blocks of a current frame of a plurality of frames of a video stream, identifying a proximal above pixel, wherein the proximal above pixel is a pixel of a block proximally above the current block, and wherein the proximal above pixel is available for predicting the current pixel, identifying a distant above pixel, wherein the distant above pixel is a most proximate reconstructed pixel above the proximal above pixel such that a pixel proximally to the right of the distant above pixel is available for prediction, and generating, by a processor, a predicted pixel for the current pixel based on the proximal above pixel, the distant above pixel, and the pixel proximally to the right of the distant above pixel.

Another aspect is a method for performing right-edge extension for quad-tree intra-prediction. The method may include identifying a current frame from the plurality of frames, the current frame including a plurality of superblocks, wherein each superblock in the plurality of superblocks includes a respective plurality of blocks, identifying a first superblock from the plurality of superblocks, identifying a first block from the plurality of blocks of the first superblock, generating predicted pixels for the first block based on reconstructed pixels from a block proximally above and to the right of the first block, identifying a second block from the plurality of blocks of the first superblock, and on a condition that reconstructed pixels from a block proximally above and to the right of the second block for predicting pixels for the second block are unavailable for prediction, generating predicted pixels for the second block. Generating predicted pixels for the second block may include identifying a proximal reconstructed pixel, wherein the proximal reconstructed pixel is proximally above the second block, identifying a distant reconstructed pixel, wherein the distant reconstructed pixel is a most proximate reconstructed pixel above the proximal reconstructed pixel such that a plurality of reconstructed pixels proximally to the right of the distant reconstructed pixel are available for prediction, generating, by a processor, a plurality of prediction pixels based on the proximal reconstructed pixel, the distant reconstructed pixel, and the plurality of reconstructed pixels proximally to the right of the distant reconstructed pixel, and generating a plurality of predicted pixels for the second block based on the plurality of prediction pixels.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Digital video may be used for various purposes including, for example, remote business meetings via video conferencing, high definition video entertainment, video advertisements, and sharing of user-generated videos. Digital video streams may represent video using a sequence of frames or images. Each frame can include a number of blocks, which may include information indicating pixel attributes, such as color values or brightness. Transmission and storage of video can use significant computing or communications resources.

Compression and other coding techniques may be used to reduce the amount of data in video streams.

Encoding a video stream, or a portion thereof, such as a frame or a block, can include using temporal and spatial similarities in the video stream to improve coding efficiency. Video encoding may include using prediction to generate predicted pixel values in a frame based on similarities between pixels. One form of prediction is intra-prediction, which can include predicting values for a current block based on values of reference blocks which correspond to spatially proximal previously encoded and decoded blocks in the current frame. However, some intra-prediction modes may not predict some portions of a frame well, such as where spatially proximal previously encoded and decoded blocks in the current frame are not available for prediction. For example, top-right diagonal down intra-prediction may include predicting pixels in a current block based on reference pixels in a block immediately above and to the right of the current block and may not predict pixels, such as right edge pixels, well for relatively large blocks where the reference pixels are not available for prediction.

Right-edge extension for quad-tree intra-prediction may improve the quality of intra-prediction, such as top-right diagonal down intra-prediction, where spatially proximal previously encoded and decoded blocks in the current frame are not available for prediction. Right-edge extension for quad-tree intra-prediction may include maintaining the top-right diagonal down intra-prediction pattern while improving prediction quality by generating prediction pixels corresponding to the unavailable reference pixels based on a combination of proximal and distant reference pixels.

Figure 1:
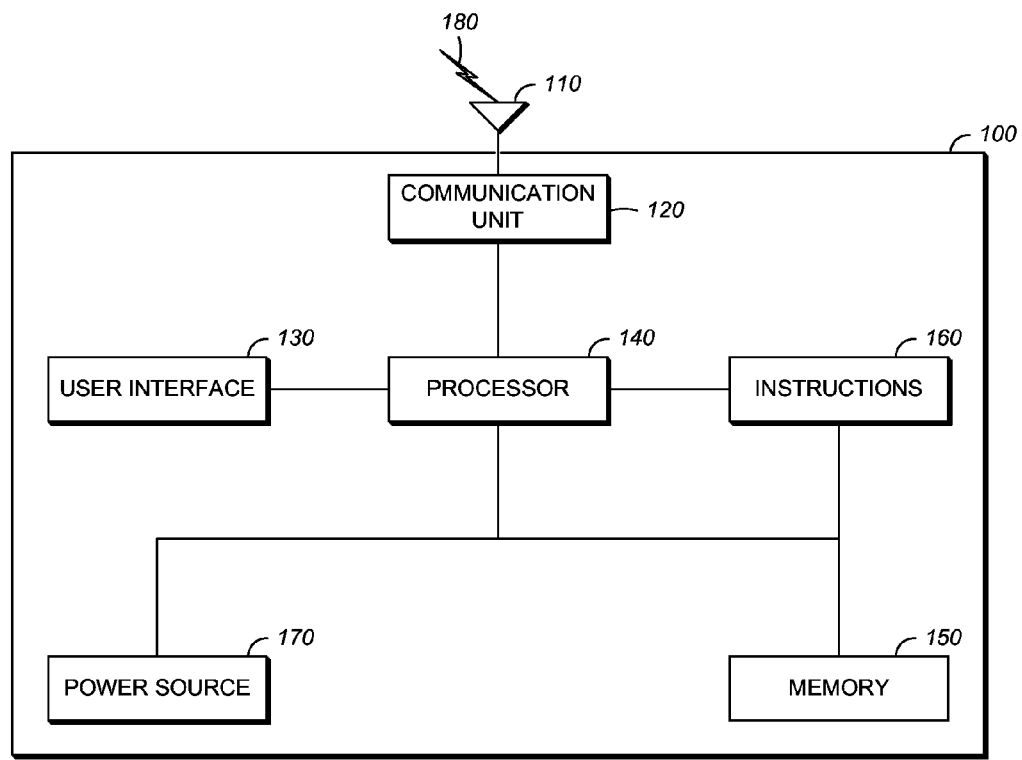
FIG. 1 is a diagram of a video encoding and decoding system in accordance with implementations of this disclosure.

FIG. 1 is a diagram of a computing device 100 in accordance with implementations of this disclosure. A computing device 100 can include a communication interface 110, a communication unit 120, a user interface (UI) 130, a processor 140, a memory 150, instructions 160, a power source 170, or any combination thereof. As used herein, the term "computing device" includes any unit, or combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one or more element of the communication device 100 can be integrated into any number of separate physical units. For example, the UI 130 and processor 140 can be integrated in a first physical unit and the memory 150 can be integrated in a second physical unit.

The communication interface 110 can be a wireless antenna, as shown, a wired communication port, such as an Ethernet port, an infrared port, a serial port, or any other wired or wireless unit capable of interfacing with a wired or wireless electronic communication medium 180.

The communication unit 120 can be configured to transmit or receive signals via a wired or wireless medium 180. For example, as shown, the communication unit 120 is operatively connected to an antenna configured to communicate via wireless signals. Although not explicitly shown in FIG. 1, the communication unit 120 can be configured to transmit, receive, or both via any wired or wireless communication medium, such as radio frequency (RF), ultra violet (UV), visible light, fiber optic, wire line, or a combination thereof. Although FIG. 1 shows a single communication unit 120 and a single communication interface 110, any number of communication units and any number of communication interfaces can be used.

The UI 130 can include any unit capable of interfacing with a user, such as a virtual or physical keypad, a touchpad, a display, a touch display, a speaker, a microphone, a video camera, a sensor, or any combination thereof. The UI 130 can be operatively coupled with the processor, as shown, or with any other element of the communication device 100, such as the power source 170. Although shown as a single unit, the UI 130 may include one or more physical units. For example, the UI 130 may include an audio interface for performing audio communication with a user, and a touch display for performing visual and touch based communication with the user. Although shown as separate units, the communication interface 110, the communication unit 120, and the UI 130, or portions thereof, may be configured as a combined unit. For example, the communication interface 110, the communication unit 120, and the UI 130 may be implemented as a communications port capable of interfacing with an external touchscreen device.

The processor 140 can include any device or system capable of manipulating or processing a signal or other information now-existing or hereafter developed, including optical processors, quantum processors, molecular processors, or a combination thereof. For example, the processor 140 can include a general purpose processor, a special purpose processor, a conventional processor, a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors. The processor can be operatively coupled with the communication interface 110, communication unit 120, the UI 130, the memory 150, the instructions 160, the power source 170, or any combination thereof.

The memory 150 can include any non-transitory computer-usable or computer-readable medium, such as any tangible device that can, for example, contain, store, communicate, or transport the instructions 160, or any information associated therewith, for use by or in connection with the processor 140. The non-transitory computer-usable or computer-readable medium can be, for example, a solid state drive, a memory card, removable media, a read only memory (ROM), a random access memory (RAM), any type of disk including a hard disk, a floppy disk, an optical disk, a magnetic or optical card, an application specific integrated circuits (ASICs), or any type of non-transitory media suitable for storing electronic information, or any combination thereof. The memory 150 can be connected to, for example, the processor 140 through, for example, a memory bus (not explicitly shown).

The instructions 160 can include directions for performing any method, or any portion or portions thereof, disclosed herein. The instructions 160 can be realized in hardware, software, or any combination thereof. For example, the instructions 160 may be implemented as information stored in the memory 150, such as a computer program, that may be executed by the processor 140 to perform any of the respective methods, algorithms, aspects, or combinations thereof, as described herein. The instructions 160, or a portion thereof, may be implemented as a special purpose processor, or circuitry, that can include specialized hardware for carrying out any of the methods, algorithms, aspects, or combinations thereof, as described herein. Portions of the instructions 160 can be distributed across multiple processors on the same machine or different machines or across a network such as a local area network, a wide area network, the Internet, or a combination thereof.

The power source 170 can be any suitable device for powering the communication device 110. For example, the power source 170 can include a wired power source; one or more dry cell batteries, such as nickel-cadmium (NiCd), nickel-zinc (NiZn), nickel metal hydride (NiMH), lithium-ion (Li-ion); solar cells; fuel cells; or any other device capable of powering the communication device 110. The communication interface 110, the communication unit 120, the UI 130, the processor 140, the instructions 160, the memory 150, or any combination thereof, can be operatively coupled with the power source 170.

Although shown as separate elements, the communication interface 110, the communication unit 120, the UI 130, the processor 140, the instructions 160, the power source 170, the memory 150, or any combination thereof can be integrated in one or more electronic units, circuits, or chips.

Figure 2:
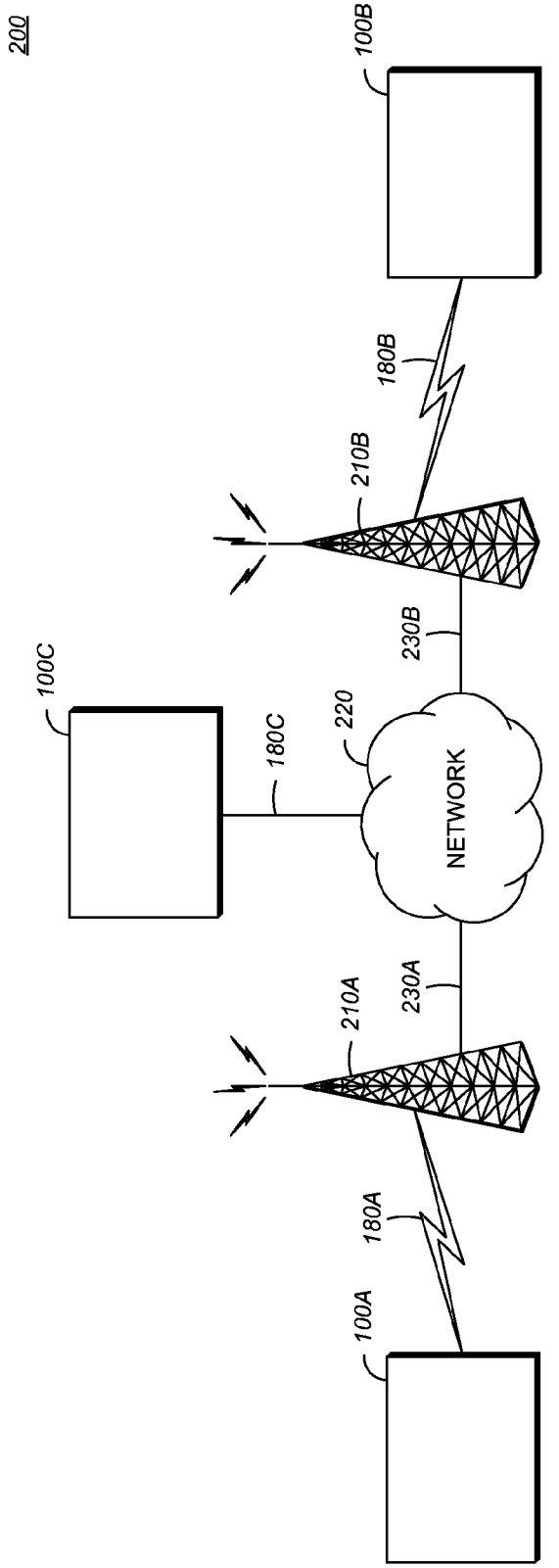
FIG. 2 is a diagram of a typical video stream for encoding and decoding in accordance with implementations of this disclosure.

FIG. 2 is a diagram of a computing and communications system 200 in accordance with implementations of this disclosure. The computing and communications system 200 may include one or more computing and communication devices 100A/100B/100C, one or more access points 210A/210B, one or more networks 220, or a combination thereof. For example, the computing and communication system 200 can be a multiple access system that provides communication, such as voice, data, video, messaging, broadcast, or a combination thereof, to one or more wired or wireless communicating devices, such as the computing and communication devices 100A/100B/100C. Although, for simplicity, FIG. 2 shows three computing and communication devices 100A/100B/100C, two access points 210A/210B, and one network 220, any number of computing and communication devices, access points, and networks can be used.

A computing and communication device 100A/100B/100C can be, for example, a computing device, such as the computing device 100 shown in FIG. 1. For example, as shown the computing and communication devices 100A/100B may be user devices, such as a mobile computing device, a laptop, a thin client, or a smartphone, and computing and the communication device 100C may be a server, such as a mainframe or a cluster. Although the computing and communication devices 100A/100B are described as user devices, and the computing and communication device 100C is described as a server, any computing and communication device may perform some or all of the functions of a server, some or all of the functions of a user device, or some or all of the functions of a server and a user device.

Each computing and communication device 100A/100B/100C can be configured to perform wired or wireless communication. For example, a computing and communication device 100A/100B/100C can be configured to transmit or receive wired or wireless communication signals and can include a user equipment (UE), a mobile station, a fixed or mobile subscriber unit, a cellular telephone, a personal computer, a tablet computer, a server, consumer electronics, or any similar device. Although each computing and communication device 100A/100B/100C is shown as a single unit, a computing and communication device can include any number of interconnected elements.

Each access point 210A/210B can be any type of device configured to communicate with a computing and communication device 100A/100B/100C, a network 220, or both via wired or wireless communication links 180A/180B/180C. For example, an access point 210A/210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A/210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the Hyper Text Transport Protocol (HTTP), or a combination thereof.

The computing and communication devices 100A/100B/100C can communicate with each other via the network 220 using one or more a wired or wireless communication links, or via a combination of wired and wireless communication links. For example, as shown the computing and communication devices 100A/100B can communicate via wireless communication links 180A/180B, and computing and communication device 100C can communicate via a wired communication link 180C. Any of the computing and communication devices 100A/100B/100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A/210B can communicate with the network 220 via one or more types of wired or wireless communication links 230A/230B. Although FIG. 2 shows the computing and communication devices 100A/100B/100C in communication via the network 220, the computing and communication devices 100A/100B/100C can communicate with each other via any number of communication links, such as a direct wired or wireless communication link.

Other implementations of the computing and communications system 200 are possible. For example, in an implementation the network 220 can be an ad-hock network and can omit one or more of the access points 210A/210B. The computing and communications system 200 may include devices, units, or elements not shown in FIG. 2. For example, the computing and communications system 200 may include many more communicating devices, networks, and access points.

Figure 3:
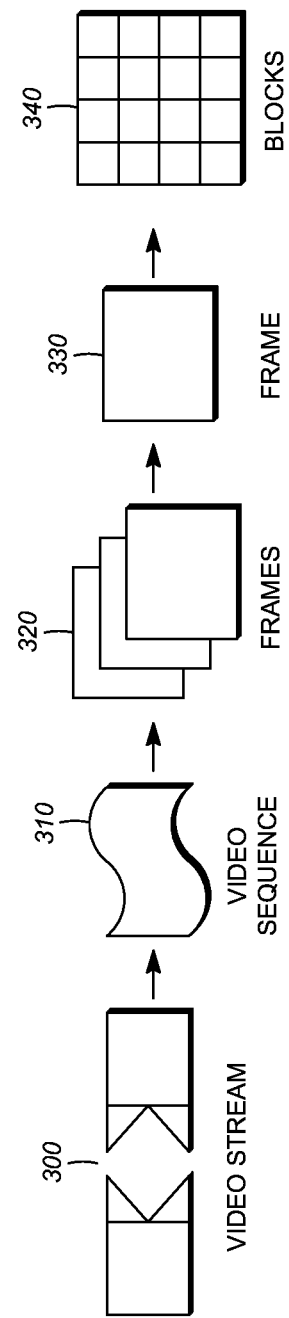
FIG. 3 is a block diagram of a video compression device in accordance with implementations of this disclosure.

FIG. 3 is a diagram of a video stream 300 for use in encoding, decoding, frame interpolation, or any combination thereof, in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320. Each frame 330 from the adjacent frames 320 may represent a single image from the video stream. A frame 330 may include blocks 340. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a superblock, a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 4:
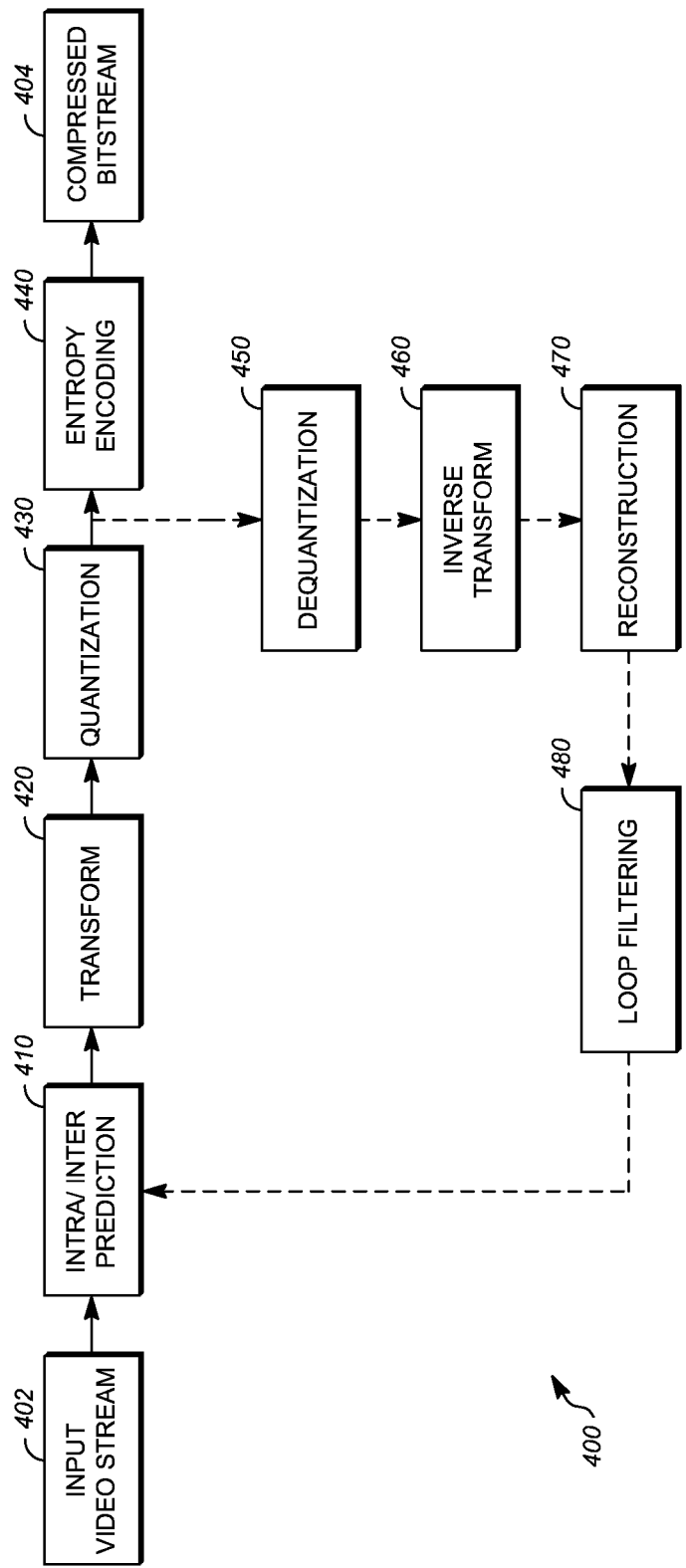
FIG. 4 is a block diagram of a video decompression device in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 160 shown in FIG. 1, and may cause the device to encode video data as described herein. The encoder 400 can be implemented as specialized hardware included, for example, in computing device 100.

The encoder 400 can encode an input video stream 402, such as the video stream 300 shown in FIG. 3 to generate an encoded (compressed) bitstream 404. In some implementations, the encoder 400 may include a forward path for generating the compressed bitstream 404. The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a loop filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference block in the reference frame.

The intra/inter prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loève Transform (KLT), the Discrete Cosine Transform (DCT), and the Singular Value Decomposition Transform (SVD). In an example, the DCT may include transforming a block into the frequency domain. The DCT may include using transform coefficient values based on spatial frequency, with the lowest frequency (i.e. DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
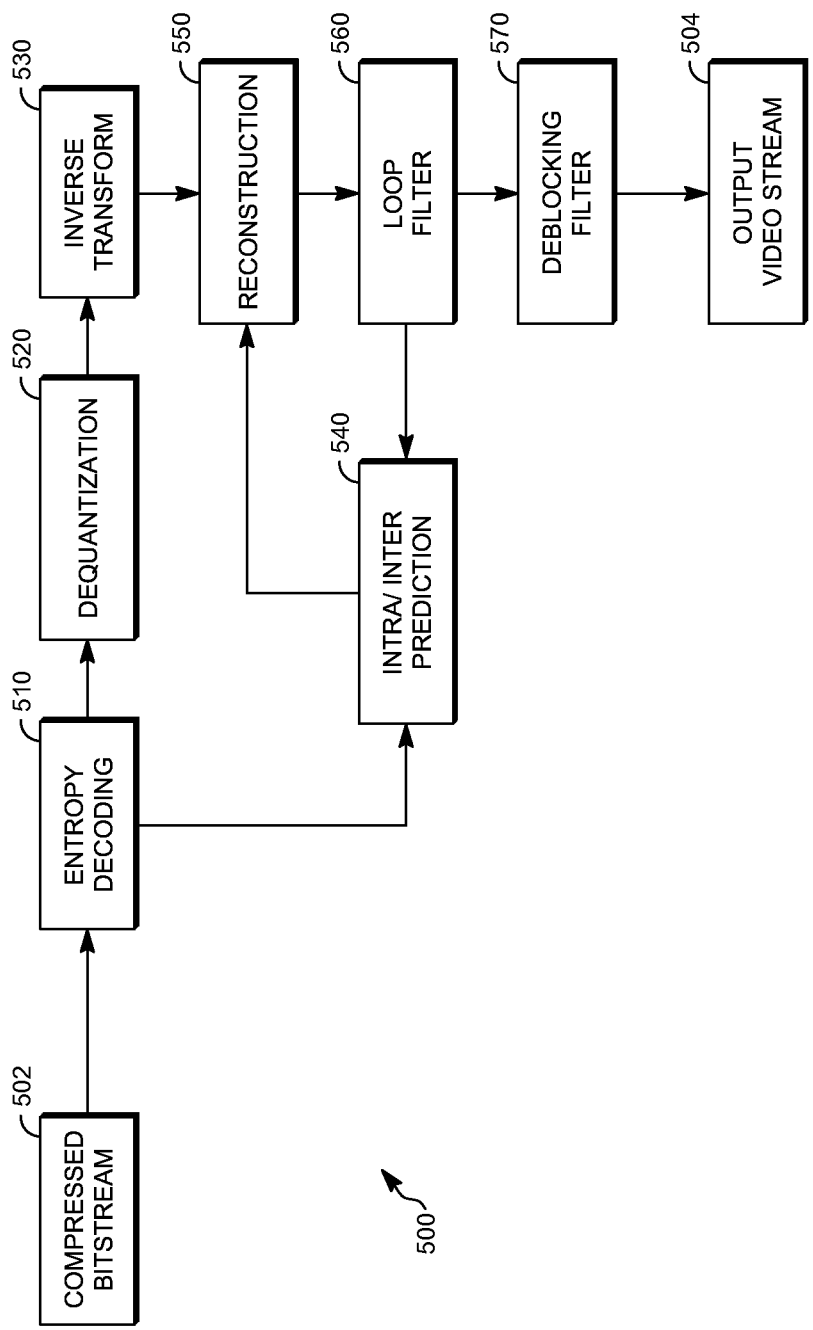
FIG. 5 is a block diagram of a representation of a frame including blocks in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below, and may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a reconstructed block. The loop filtering unit 480 can be applied to the reconstructed block to reduce distortion, such as blocking artifacts.

Other variations of the encoder 400 can be used to encode the compressed bitstream 404. For example, a non-transform based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 160 shown in FIG. 1, and may cause the device to decode video data as described herein. The decoder 400 can be implemented as specialized hardware included, for example, in computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a loop filtering unit 560, a deblocking filtering unit 570, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond with the derivative residual block generated by the inverse transformation unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a reconstructed block. The loop filtering unit 560 can be applied to the reconstructed block to reduce blocking artifacts. The deblocking filtering unit 570 can be applied to the reconstructed block to reduce blocking distortion, and the result may be output as the output video stream 504.

Other variations of the decoder 500 can be used to decode the compressed bitstream 502. For example, the decoder 500 can produce the output video stream 504 without the deblocking filtering unit 570.

Figure 6:
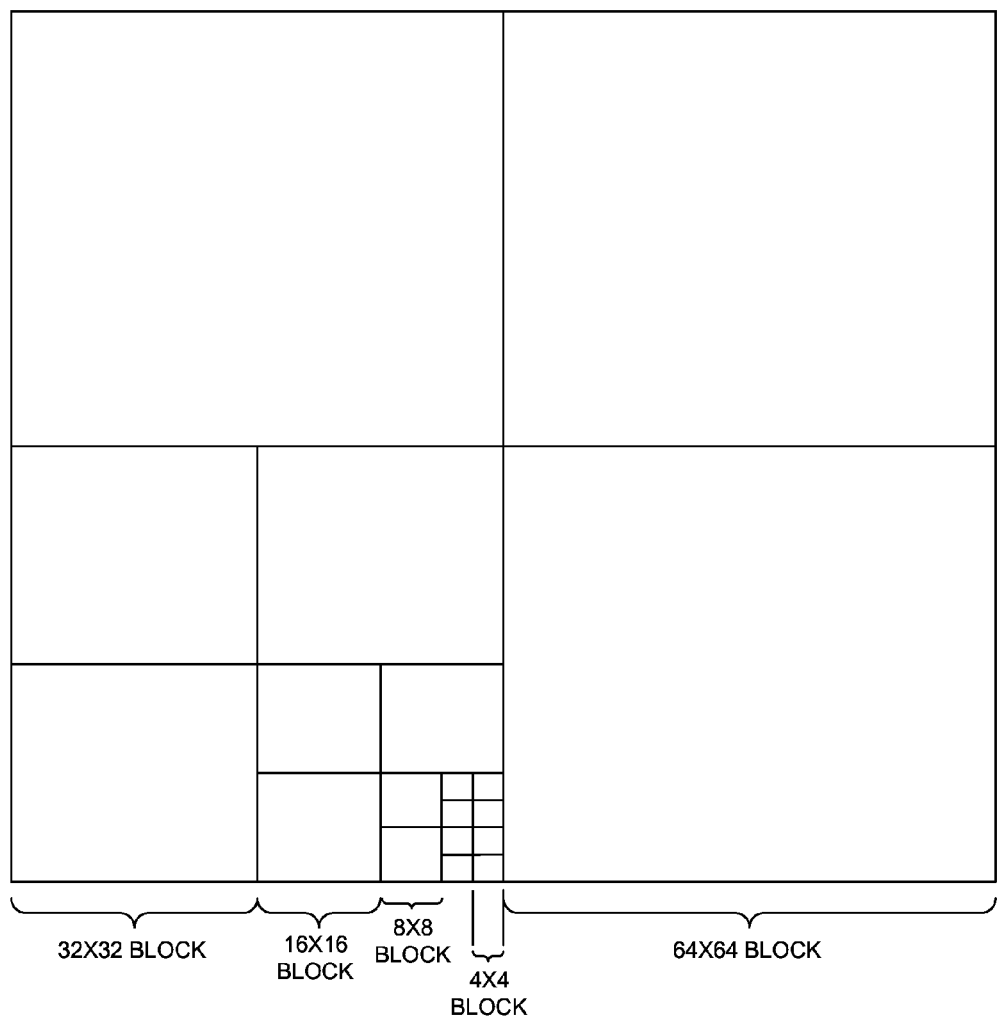
FIG. 6 is a block diagram of a representation of a portion of a frame in accordance with implementations of this disclosure.

FIG. 6 is a block diagram of a representation of a portion of a frame, such as frame 330 shown in FIG. 3, in accordance with implementations of this disclosure. As shown, the portion of the frame includes four 64×64 blocks, which may be referred to as superblocks, in two rows and two columns in a matrix or Cartesian plane. In some implementations, a superblock may be a basic or maximum coding unit. Each superblock may include four 32×32 blocks. Each 32×32 block may include four 16×16 blocks. Each 16×16 block may include four 8×8 blocks. Each 8×8 block may include four 4×4 blocks. Each 4×4 block may include 16 pixels which may be represented in four rows and four columns in each respective block in the Cartesian plane or matrix. Although one arrangement of blocks is shown, any arrangement may be used. Although FIG. 610 show N×N blocks, in some implementations, N×M blocks may be used. For example, 32×64 blocks, 64×32 blocks, 16×32 blocks, 32×16 blocks, or any other size blocks may be used. In some implementations, N×2N blocks, 2N×N blocks, or a combination thereof may be used.

In some implementations, video coding may include ordered block-level coding. Ordered block-level coding may include coding blocks of a frame in an order, such as raster-scan order, wherein blocks may be identified and processed starting with a block in the upper left corner of the frame, or portion of the frame, and proceeding along rows from left to right and from the top row to the bottom row, identifying each block in turn for processing. For example, the superblock in the top row and left column of a frame may be the first block coded and the superblock immediately to the right of the first block may be the second block coded. The second row from the top may be the second row coded, such that the superblock in the left column of the second row may be coded after the superblock in the rightmost column of the first row.

In some implementations, coding a block may include using quad-tree coding, which may include coding smaller block units with a block in raster-scan order. For example, the 64×64 superblock shown in the bottom left corner of the portion of the frame shown in FIG. 6, may be coded using quad-tree coding wherein the top left 32×32 block may be coded, then the top right 32×32 block may be coded, then the bottom left 32×32 block may be coded, and then the bottom right 32×32 block may be coded. Each 32×32 block may be coded using quad-tree coding wherein the top left 16×16 block may be coded, then the top right 16×16 block may be coded, then the bottom left 16×16 block may be coded, and then the bottom right 16×16 block may be coded. Each 16×16 block may be coded using quad-tree coding wherein the top left 8×8 block may be coded, then the top right 8×8 block may be coded, then the bottom left 8×8 block may be coded, and then the bottom right 8×8 block may be coded. Each 8×8 block may be coded using quad-tree coding wherein the top left 4×4 block may be coded, then the top right 4×4 block may be coded, then the bottom left 4×4 block may be coded, and then the bottom right 4×4 block may be coded. In some implementations, 8×8 blocks may be omitted for a 16×16 block, and the 16×16 block may be coded using quad-tree coding wherein the top left 4×4 block may be coded, then the other 4×4 blocks in the 16×16 block may be coded in raster-scan order.

Although right-edge extension for quad-tree intra-prediction is described herein with reference to matrix or Cartesian representation of a frame for clarity, a frame may be stored, transmitted, processed, or any combination thereof, in any data structure such that pixel values may be efficiently predicted for a frame or image. For example, a frame may be stored, transmitted, processed, or any combination thereof, in a two dimensional data structure such as a matrix as shown, or in a one dimensional data structure, such as a vector array. In an implementation, a representation of the frame, such as a two dimensional representation as shown, may correspond to a physical location in a rendering of the frame as an image. For example, a pixel in the top left corner of a block in the top left corner of the frame may correspond with a physical pixel in the top left corner of a rendering of the frame as an image.

Figure 7:
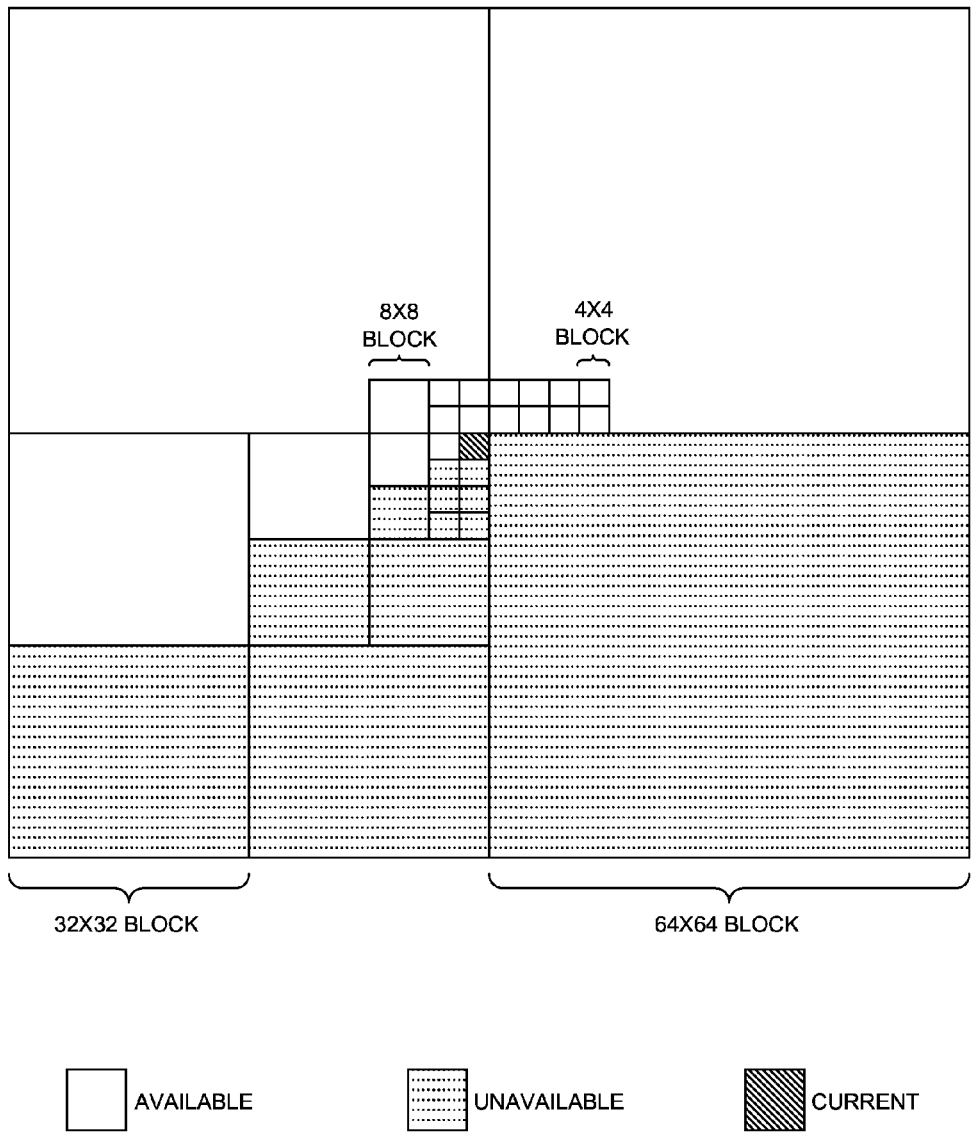
FIG. 7 is a block diagram of a representation of a portion of a frame for intra-coding in accordance with implementations of this disclosure.

FIG. 7 is a block diagram of a representation of a portion of a frame for intra-coding in accordance with implementations of this disclosure. In some implementations, intra-prediction coding may include predicting values for a current block based on values of reference blocks which may correspond to previously encoded and decoded blocks in the current frame. In intra-prediction reference blocks can be identified using one or more intra prediction modes, such as horizontal prediction, vertical prediction, diagonal prediction, DC prediction, or TrueMotion prediction. In some implementations, an intra-prediction mode may be identified for coding each respective 4×4 block.

For example, horizontal prediction may be used to predict pixel values based on horizontal similarities between pixels and can include filling each column of a current block with a copy of a column to the left of the current block. Similarly, vertical prediction may be used to predict pixel values based on vertical similarities between pixels and can include filling each row of a current block with a copy of a row above the current block. Diagonal prediction may be used to predict pixel values based on diagonal similarities between pixels and can include filling a column or row of pixels of a current block with copies of pixels from a block diagonal to the current block.

For clarity, blocks in a frame may be identified based on location relative to a current block in the frame, wherein the current block refers to the block currently identified for coding, a pixel of the current block identified for coding may be referred to as the current pixel, the 8×8 block including the current block may be referred to as the current 8×8 block, the 16×16 block including the current block may be referred to as the current 16×16 block, the 32×32 block including the current block may be referred to as the current 32×32 block, and the 64×64 block including the current block may be referred to as the current 64×64 block or the current superblock.

In FIGS. 7-10, a current block for intra-coding may be indicated using diagonal lines, blocks and pixels that are available for coding the current block may be indicated using white, and pixels and blocks that are unavailable for coding the current block may be indicated using stippling. The blocks and pixels that are available for use in coding the current block may include reconstructed blocks and pixels that were previously encoded and decoded. For encoding the current block, the blocks and pixels that are unavailable may be unencoded or raw blocks and pixels. For decoding the current block, the unavailable blocks and pixels may be encoded blocks and pixels that have not been decoded.

For example, as shown in FIG. 7, the current block for intra-coding is the top right 4×4 block of the top right 8×8 block of the top right 16×16 block of the top right 32×32 block of the bottom left 64×64 block of the portion of the frame shown. The top left and top right superblocks are shown as available for coding the current block, which may indicate that reconstructed pixels corresponding to the available blocks were previously generated. Similarly, the top left 32×32 block of the current superblock, the top left 16×16 block of the current 32×32 block, the top left 8×8 block of the current 16×16 block, and the 4×4 block immediately to the left of the current block in the current 8×8 block, are shown as available for coding the current block.

Figure 8:
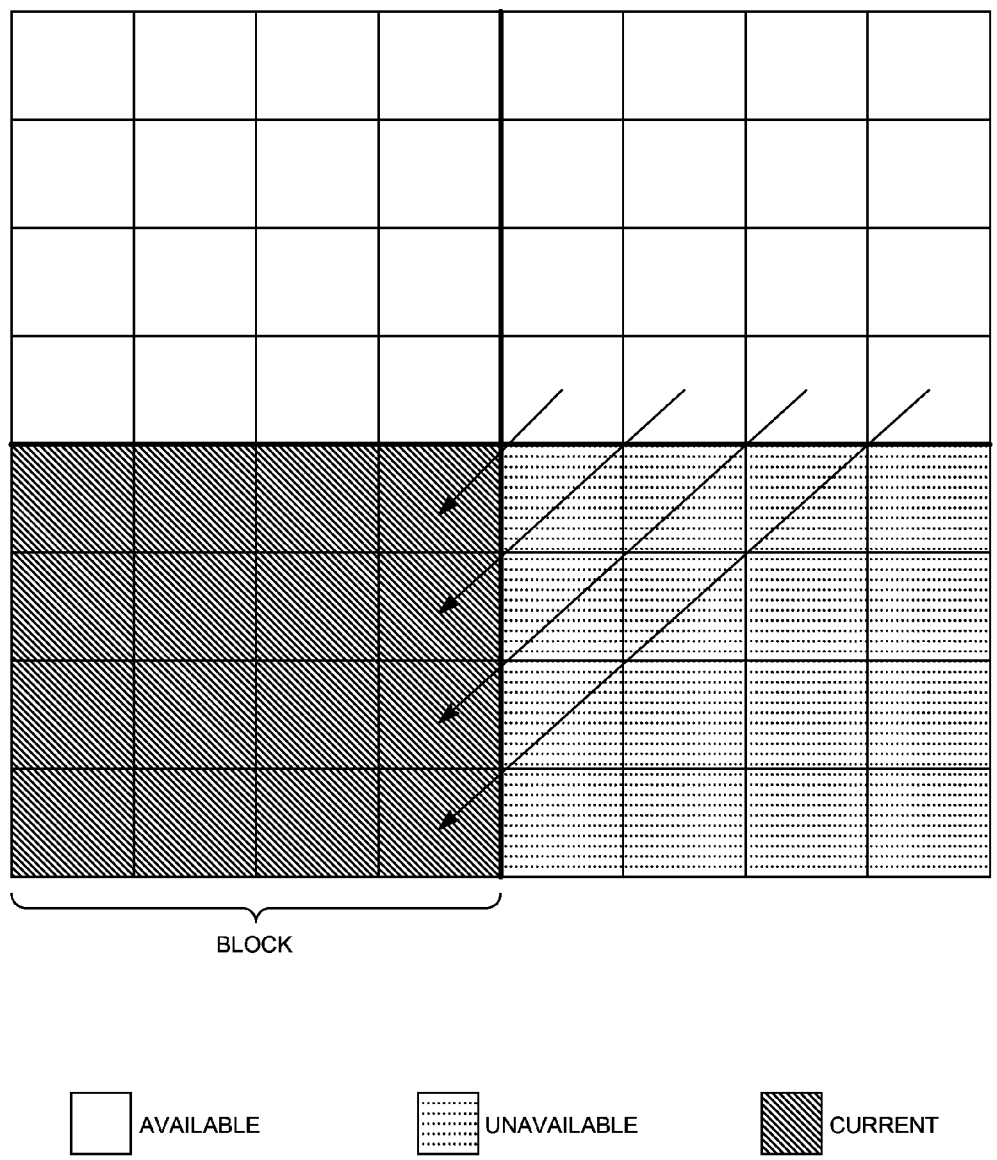
FIG. 8 is a block diagram of a representation of a portion of a frame for diagonal intra-prediction in accordance with implementations of this disclosure.

FIG. 8 is a block diagram of a representation of a portion of a frame for diagonal intra-coding in accordance with implementations of this disclosure. FIG. 8 shows a current block, and three proximal neighboring blocks. For clarity, block boundaries are shown using bolded lines. The blocks may be in separate coding units. For example, the current block, shown as the bottom left block in FIG. 8, may be the top right 4×4 block of the top right 8×8 block of the top right 16×16 block of the top right 32×32 block of the bottom left 64×64 block of a portion of a frame, such as the current block shown in FIG. 7. The top left block shown in FIG. 8 may be the bottom right 4×4 block of the bottom right 8×8 block of the bottom right 16×16 block of the bottom right 32×32 block of the top left superblock of the portion of the frame, and may be available for coding the current block. The top right block shown in FIG. 8 may be the bottom left 4×4 block of the bottom left 8×8 block of the bottom left 16×16 block of the bottom left 32×32 block of the top right superblock of the portion of the frame, and may be available for coding the current block. The bottom right block shown in FIG. 8 may be the top left 4×4 block of the top left 8×8 block of the top left 16×16 block of the top left 32×32 block of the bottom right superblock of the portion of the frame, and may be unavailable for coding the current block.

In some implementations, diagonal intra-coding may include top-right diagonal down intra-prediction, wherein values of the rightmost column of the current block may be predicted by copying the values of blocks in a row diagonally above and to the right of the current block as shown.

Figure 9:
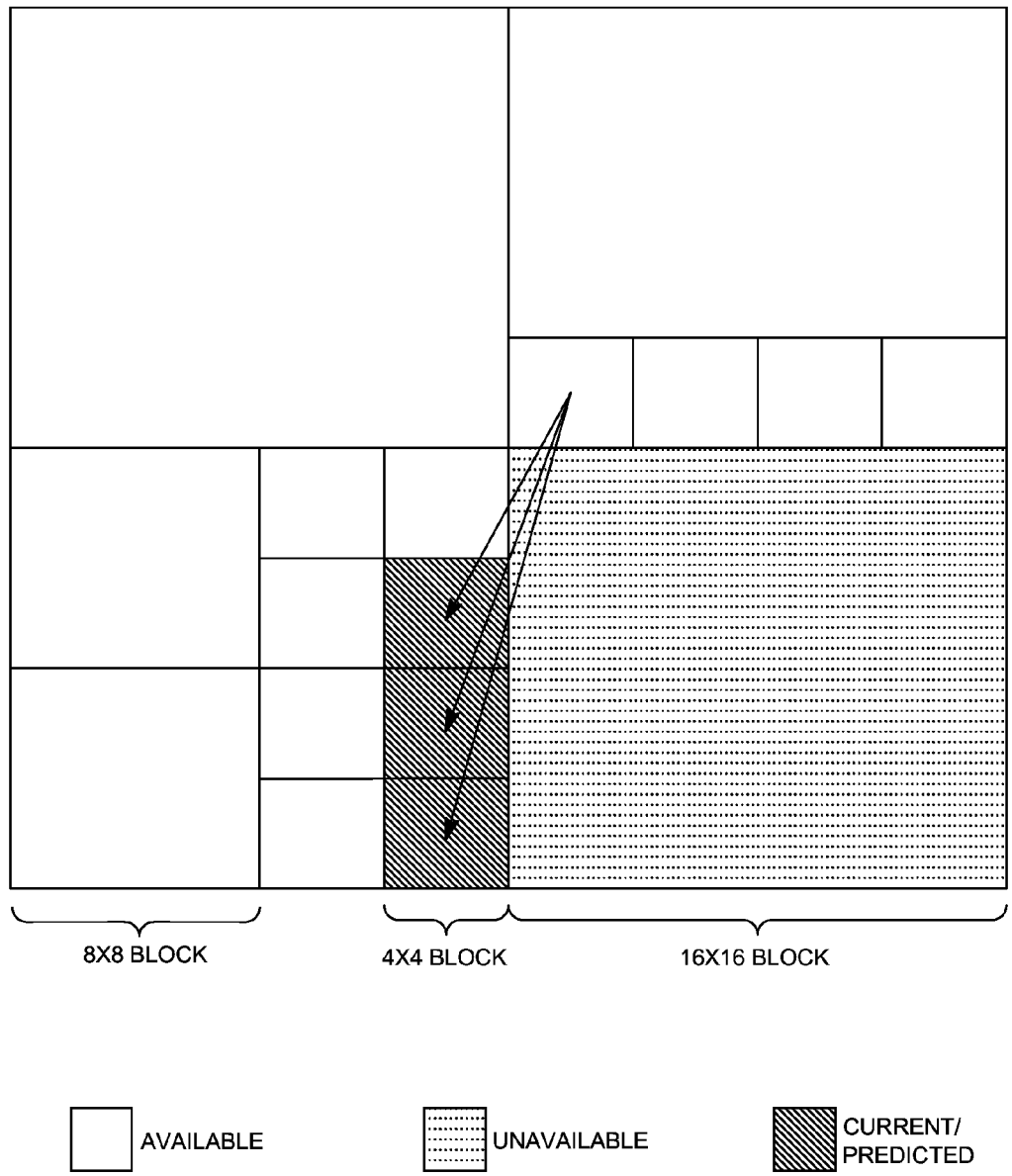
FIG. 9 is a block diagram of another representation of a portion of a frame for diagonal intra-prediction in accordance with implementations of this disclosure.

FIG. 9 is a block diagram of another representation of a portion of a frame for diagonal intra-prediction in accordance with implementations of this disclosure. In some implementations, intra-prediction may be performed using 16×16 blocks as the maximum coding unit and may include identifying respective coding modes for coding 4×4 blocks in scan order. Blocks in the top row or left three columns may be predicted using reference blocks above and to the right the respective block. Reconstructed blocks may be unavailable for predicting blocks in the rightmost column of the bottom three rows. Diagonal intra-prediction may be performed for the blocks for which reference blocks are unavailable by copying pixels from the top-right block edge to each position. For example, the four pixel values above and to the right of the top right 4×4 block of the top right 8×8 block of the current 16×16 block, which may be the pixels in the bottom left 4×4 block of the bottom left 8×8 block of the 16×16 block above and to the right of the current 16×16 block, may be copied to each of the respective blocks in the rightmost column of the bottom three rows of the current 16×16 block as shown. The prediction quality may be proportional to the distance from the reference block to the respective predicted block.

Figure 10:
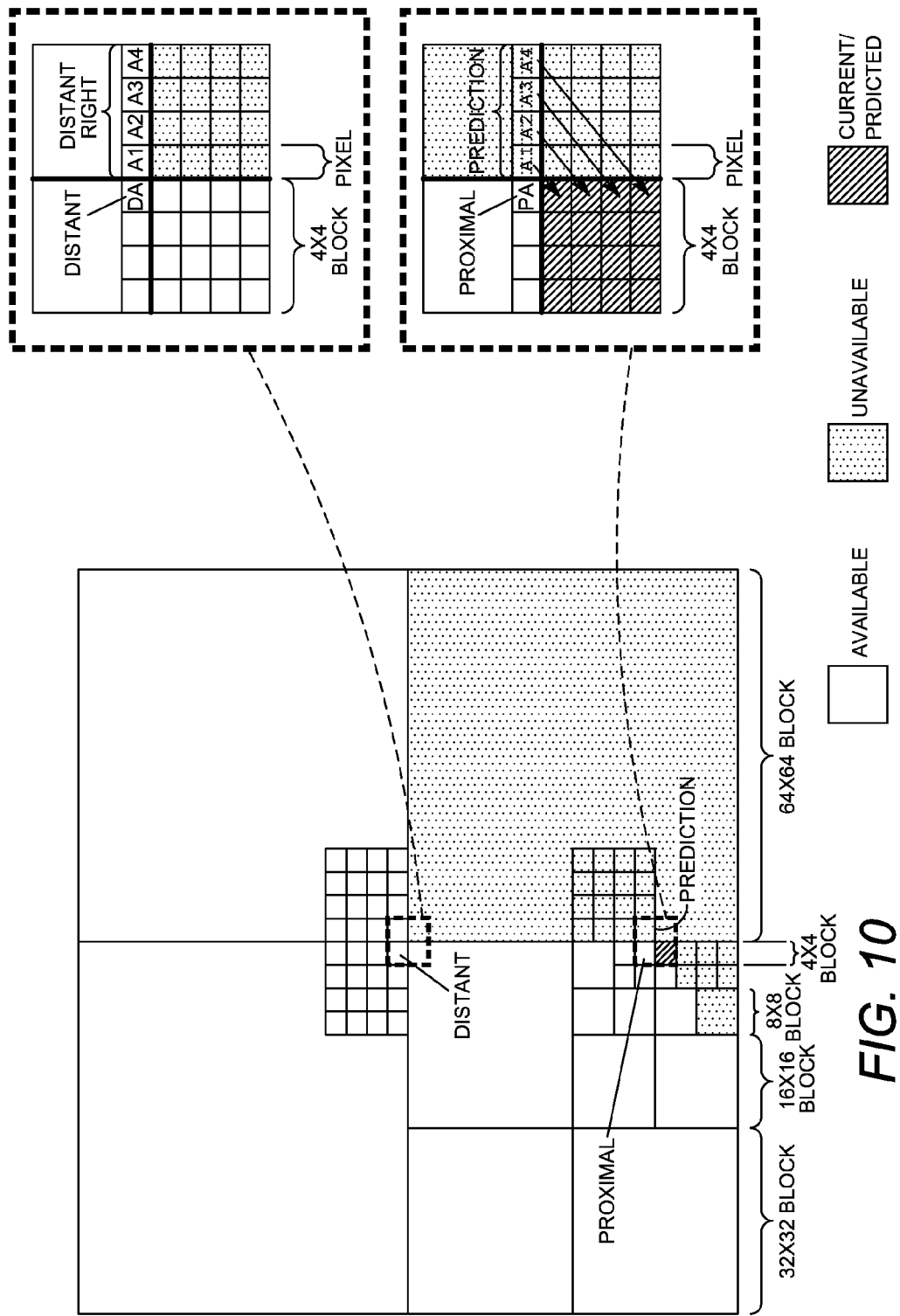
FIG. 10 is a block diagram of a representation of a portion of a frame for right-edge extension for quad-tree intra-prediction in accordance with implementations of this disclosure.

FIG. 10 is a block diagram of a representation of a portion of a frame for right-edge extension for quad-tree intra-prediction in accordance with implementations of this disclosure. In some implementations, right-edge extension for quad-tree intra-prediction may include predicting pixels for a current block where reference pixels for performing diagonal intra-prediction are unavailable. For example, reference blocks may be unavailable for performing intra-prediction, such as top-right diagonal down intra-prediction, for some blocks, such as the bottom right 4×4 block of the top right 8×8 block of the top right 16×16 block of the top right 32×32 block of the current superblock, the rightmost 4×4 blocks of the bottom right 8×8 block of the top right 16×16 block of the top right 32×32 block of the current superblock, the rightmost 4×4 blocks of the rightmost 8×8 blocks of the bottom right 16×16 block of the top right 32×32 block of the current superblock, the rightmost 4×4 blocks of the rightmost 8×8 blocks of the rightmost 16×16 blocks of the bottom right 32×32 block of the current superblock, the bottom right 8×8 block of the top right 16×16 block of the top right 32×32 block of the current superblock, the rightmost 8×8 blocks of the bottom right 16×16 block of the top right 32×32 block of the current superblock, the rightmost 8×8 blocks of the rightmost 16×16 blocks of the bottom right 32×32 block of the current superblock, the bottom right 16×16 block of the top right 32×32 block of the current superblock, the rightmost 16×16 blocks of the bottom right 32×32 block of the current superblock, or the bottom right 32×32 block of the current superblock.

As shown, the blocks immediately above and to the right of the current block may be unavailable for predicting the current block. Although FIG. 10 shows right-edge extension for quad-tree intra-prediction for a 4×4 current block, right-edge extension for quad-tree intra-prediction may be performed for an 8×8 block, a 16×16 block, a 32×32 block, or any other block or coding unit, as described herein. Although not shown in FIG. 10, the rightmost current raw pixel in the top row of the current block may be referred to as C1 and the corresponding predicted pixel may be referred to as C'1, the rightmost current raw pixel in the second row from the top of the current block may be referred to as C2 and the corresponding predicted pixel may be referred to as C'2, the rightmost current raw pixel in the third row from the top of the current block may be referred to as C3 and the corresponding predicted pixel may be referred to as C'3, and the rightmost current raw pixel bottom row of the current block may be referred to as C4 and the corresponding predicted pixel may be referred to as C'4.

Although not shown in FIG. 10, diagonal intra-prediction for a current block where reference pixels for performing diagonal intra-prediction are unavailable may include generating prediction pixels (A'N) corresponding to the unavailable above right pixels by direct copying. For example, prediction pixels A'N may be generated by extending, or copying, the proximal above pixel (PA), which may be expressed as A'N=PA. As used herein the term proximal indicates immediately adjacent and the proximal above pixel PA may indicate a pixel that is available for prediction immediately above the current block. In some implementations, the prediction pixels A'N may be referred to as the proximal above right pixels. In another example, prediction pixels A'N may be generated by copying available distant above pixels (AN) from the row above and to the right of the current superblock, which may be expressed as A'N=AN. The term distant above right pixel may indicate the nearest, or most proximate, pixel above and to the right of the current block having a pixel is available for prediction. For example, diagonal intra-prediction for 64×64 blocks may be similar to the diagonal intra-prediction for 16×16 blocks shown in FIG. 9. The distance between the predicted block and the reference block used may be relatively large, such as 60 pixels, and the prediction quality may be relatively low.

As shown in FIG. 10, in some implementations, right-edge extension for quad-tree intra-prediction may include predicting pixels for a current block by generating prediction pixels A'N based on a proximal above pixel (PA), a distant above pixel (DA), and at least one distant above right pixel AN. The proximal above pixel PA, the distant above pixel DA, and the distant above right pixel AN may be pixels that are available for prediction, such as reconstructed pixels that have been encoded and decoded. The distant above pixel DA may indicate the nearest, or most proximate, pixel above the current block having a pixel proximally to the right that is available for prediction, which may be the distant above right pixel AN. The prediction pixels A'N may be generated such that a prediction pixel A'N may be based on the difference between the distant above pixel DA and the sum of a corresponding distant above right pixel AN and the proximal above pixel PA, which may be expressed as A'N=AN+PA−DA. For example, a first prediction pixel may be expressed as A'1=A1+PA−DA, a second prediction pixel may be expressed as A'2=A2+PA−DA, a third prediction pixel may be expressed as A'3=A3+PA−DA, and a fourth prediction pixel may be expressed as A'4=A4+PA−DA. In some implementations, the value of the prediction pixels A'N may be adjusted to be in the range [0, 255]. Generating the prediction pixels A'N based on the proximal above pixel PA, the distant above pixel DA, and the distant above right pixel AN may maintain the diagonal intra-prediction patter, and may improve prediction quality relative to directly copying available distant above right pixels (AN), such that the generated prediction pixels A'N may have a more local DC.

Although FIG. 10 shows right-edge extension for quad-tree intra-prediction for pixels at the right edge of the current block, right-edge extension for quad-tree intra-prediction may be performed for any pixel where reference pixels for performing intra-prediction of the current pixels are unavailable.

Figure 11:
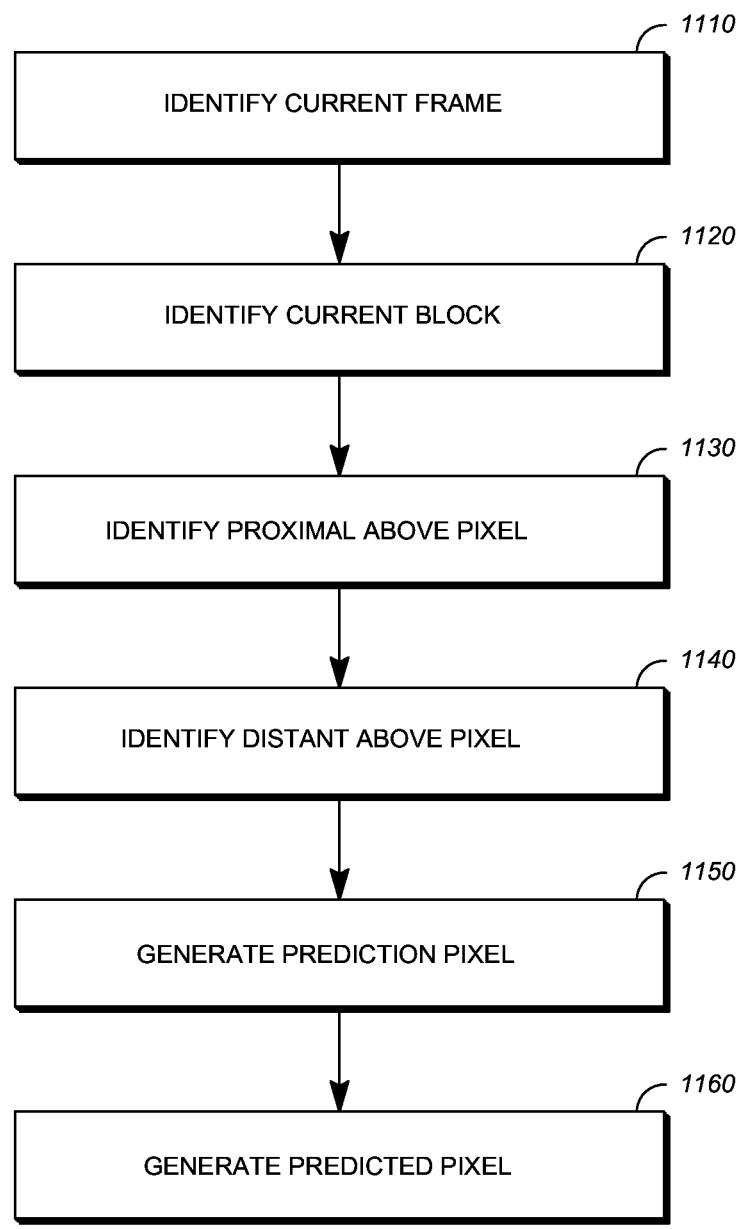
FIG. 11 is a block diagram of an example of right-edge extension for quad-tree intra-prediction in accordance with implementations of this disclosure.

FIG. 11 is a block diagram of an example of right-edge extension for quad-tree intra-prediction in accordance with implementations of this disclosure. Right-edge extension for quad-tree intra-prediction may include identifying a current frame at 1110, identifying a current block at 1120, identifying a proximal above pixel at 1130, identifying a distant above pixel at 1140, generating a prediction pixel at 1150, generating a predicted pixel at 1160, or any combination thereof. In some implementations, right-edge extension for quad-tree intra-prediction may be implemented in a decoder, such as the decoder 500 shown in FIG. 5, or in the decoding path of an encoder, such as the encoder 400 shown in FIG. 4.

In some implementations, a current frame may be identified at 1110. The current frame may be a frame, such as the frame 330 shown in FIG. 3, of a video stream, such as the input video stream 402 shown in FIG. 4 or the compressed bitstream 502 show in FIG. 5. The frame may include a plurality of blocks, or coding units, such as the blocks shown in FIG. 6, which may include 64×64 blocks, 32×32 blocks, 16×16 blocks, 8×8 blocks, 4×4 blocks, or any other size block. The blocks may include pixels. In some implementations, identifying the current frame may include determining whether to code the frame using intra-prediction.

In some implementations, a current block may be identified at 1120. Identifying the current block may include determining whether to code the current block using top-right diagonal down intra-prediction, and may include identifying a current block including a current pixels, which may be right edge pixels of the current block, where reference pixels for performing diagonal intra-prediction of the current pixels are unavailable. For example, the top right 4×4 block of the top right 8×8 block of the bottom right 16×16 block of the bottom right 32×32 block of the bottom left superblock of a portion of a frame, such as the current block shown in FIG. 10, may be identified as the current block.

In some implementations, a proximal above pixel may be identified at 1130. For example, the proximal above pixel may be the bottom right pixel in the block immediately above the current block and the current pixels, and may be available for prediction, such as the proximal above pixel PA shown in FIG. 10. Reconstructed pixels proximally to the right of the proximal above pixel may not be available for prediction.

In some implementations, a distant above pixel may be identified at 1140. For example, identifying the distant above pixel may include identifying the nearest, or most proximate, pixel above the current block and the current pixels that is available for prediction and has a pixel proximally to the right that is available for prediction, such as the distant above pixel DA shown in FIG. 10. For example, the current block may be the bottom right 4×4 block of the bottom right 8×8 block of the bottom right 16×16 block of the bottom right 32×32 block of the bottom left 64×64 block of a portion of a frame, the superblock to the right of the current superblock may be unavailable for prediction, and the distant above pixel may be the bottom right pixel of the bottom right 4×4 block of the bottom right 8×8 block of the bottom right 16×16 block of the bottom right 32×32 block of the top left superblock of the portion of the frame and may be 60 pixels away from the current block.

In some implementations, a prediction pixel may be generated at 1150. Generating a prediction pixel may include identifying a current pixel in the current block for coding, and identifying a prediction pixel corresponding to the current pixel, and identifying a distant above right pixel corresponding to the prediction pixel. The distant above right pixel may be proximately to the right of the distant above pixel and may be available for prediction. For example, as shown in FIG. 10, the current pixel may be the top right pixel of the current block, which may correspond with the leftmost prediction pixel A'1, which may correspond with the leftmost distant above right pixel A1; or the current pixel may be the bottom right pixel of the current block, which may correspond with the rightmost prediction pixel A'4, which may correspond with the rightmost distant above right pixel A4. Generating a prediction pixel may include determining the difference between the distant above pixel and the sum of a corresponding distant above right pixel and the proximal above pixel.

In some implementations, a predicted pixel may be generated at 1160. Generating the predicted pixel for the current block may include using the prediction pixel generated at 1150. For example, a prediction pixel for a current pixel of the current block may be generated using the value of the corresponding prediction pixel as the value of the predicted pixel.

Other implementations of the diagrams of right-edge extension for quad-tree intra-prediction as shown in FIGS. 10-11 are available. In implementations, additional elements of right-edge extension for quad-tree intra-prediction can be added, certain elements can be combined, and/or certain elements can be removed. For example, generating a prediction pixel at 1150 may be omitted and a predicted pixel CW for a current pixel CN of a current block may be generated based on the difference between the distant above pixel DA and the sum of a corresponding distant above right pixel AN and the proximal above pixel PA.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, not all elements of the methods described herein may be required to implement a method in accordance with the disclosed subject matter.

The implementations of the transmitting station 100A and/or the receiving station 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 100A and the receiving station 100B do not necessarily have to be implemented in the same manner.

Further, in one implementation, for example, the transmitting station 100A or the receiving station 100B can be implemented using a general purpose computer or general purpose/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

The transmitting station 100A and receiving station 100B can, for example, be implemented on computers in a real-time video system. Alternatively, the transmitting station 100A can be implemented on a server and the receiving station 100B can be implemented on a device separate from the server, such as a hand-held communications device. In this instance, the transmitting station 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 100A. Other suitable transmitting station 100A and receiving station 100B implementation schemes are available. For example, the receiving station 100B can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method for decoding a video stream including a plurality of frames, the method comprising:
   identifying a current frame from the plurality of frames, the current frame including a plurality of blocks;
   identifying a current block from the plurality of blocks;
   decoding a portion of the current frame, wherein decoding the portion of the current frame includes generating a plurality of reconstructed pixels, wherein each reconstructed pixel from the plurality of reconstructed pixels is available for prediction for decoding the current block;
   identifying a proximal reconstructed pixel from the plurality of reconstructed pixels, wherein the proximal reconstructed pixel is proximally above the current block, and wherein the proximal reconstructed pixel is in a first column;
   identifying a distant reconstructed pixel from the plurality of reconstructed pixels, wherein the distant reconstructed pixel is the nearest reconstructed pixel above the proximal reconstructed pixel in the first column having a reconstructed pixel proximally to the right;
   identifying a distant right reconstructed pixel from the plurality of reconstructed pixels, wherein the distant right reconstructed pixel is the reconstructed pixel proximally to the right of the distant reconstructed pixel;
   generating, by a processor, a prediction pixel based on the proximal reconstructed pixel, the distant reconstructed pixel, and the distant right reconstructed pixel; and
   generating a predicted pixel for the current block based on the prediction pixel.

2. The method of claim 1, wherein the prediction pixel is a first prediction pixel from a plurality of prediction pixels, and wherein generating the prediction pixel includes generating the plurality of prediction pixels such that a second prediction pixel from the plurality of prediction pixels is generated based on the proximal reconstructed pixel, the distant reconstructed pixel, and a reconstructed pixel proximally from the plurality of reconstructed pixels to the right of the distant right reconstructed pixel.

3. The method of claim 2, wherein the predicted pixel is a first predicted pixel from a plurality of predicted pixels for the current block, and wherein generating the predicted pixel includes generating the first predicted pixel based on the first prediction pixel and generating a second predicted pixel from the plurality of predicted pixels based on the second prediction pixel.

4. The method of claim 1, wherein the frame includes a plurality of superblocks, and wherein identifying the current block includes identifying a first superblock from the plurality superblocks and identifying the current block in the first superblock.

5. The method of claim 4, wherein a superblock includes 64×64 pixels.

6. The method of claim 4, wherein the current block is in a first superblock and the proximal reconstructed pixel is in a second superblock proximally above the first superblock.

7. The method of claim 6, wherein the distant reconstructed pixel is in the second superblock.

8. The method of claim 6, wherein the distant right reconstructed pixel is in a third superblock proximally to the right of the second superblock.

9. The method of claim 1, wherein generating the prediction pixel includes determining a difference between the distant reconstructed pixel and a sum of the distant right reconstructed pixel and the proximal reconstructed pixel.

10. The method of claim 1, wherein generating the predicted pixel includes determining a difference between the distant above pixel and a sum of the distant right pixel and the proximal above pixel.

11. A method for decoding a video stream including a plurality of frames, the method comprising:
 identifying a current pixel of a current block from a plurality of blocks of a current frame of a plurality of frames of a video stream;
 identifying a proximal above pixel, wherein the proximal above pixel is a pixel of a block proximally above the current block in a first column, and wherein the proximal above pixel is available for predicting the current pixel;
 identifying a distant above pixel, wherein the distant above pixel is pixel above the proximal above pixel in the first column having a pixel proximally to the right that is available for prediction;
 identifying a distant right pixel, wherein the distant right pixel is the pixel proximally to the right of the distant above pixel; and
 generating, by a processor, a predicted pixel for the current pixel based on the proximal above pixel, the distant above pixel, and the distant right pixel.

12. The method of claim 11, wherein the current pixel is a first current pixel from a plurality of current pixels in the current block, and wherein generating the predicted pixel includes generating a plurality of predicted pixels such that a second predicted pixel from the plurality of predicted pixels is generated for a second current pixel from the plurality of current pixels proximally below the first current pixel, based on the proximal above pixel, the distant above pixel, and a pixel proximally to the right of the distant right pixel.

13. The method of claim 11, wherein the frame includes a plurality of superblocks, and wherein identifying the current block includes identifying a first superblock from the plurality superblocks and identifying the current block in the first superblock.

14. The method of claim 13, wherein a superblock includes 64×64 pixels.

15. The method of claim 13, wherein the current block is in a first superblock and the proximal above pixel is in a second superblock proximally above the first superblock.

16. The method of claim 15, wherein the distant above pixel is in the second superblock.

17. The method of claim 15, wherein the distant right pixel is in a third superblock proximally to the right of the second superblock.

18. A method for decoding a video stream including a plurality of frames, the method comprising:
 identifying a current frame from the plurality of frames, the current frame including a plurality of superblocks, wherein each superblock in the plurality of superblocks includes a respective plurality of blocks;
 identifying a first superblock from the plurality of superblocks;
 identifying a first block from the plurality of blocks of the first superblock;
 generating predicted pixels for the first block based on reconstructed pixels from a block proximally above and to the right of the first block;
 identifying a second block from the plurality of blocks of the first superblock; and
 on a condition that reconstructed pixels from a block proximally above and to the right of the second block for predicting pixels for the second block are unavailable for prediction, generating predicted pixels for the second block by:
  identifying a proximal reconstructed pixel, wherein the proximal reconstructed pixel is proximally above the second block in a first column,
  identifying a distant reconstructed pixel, wherein the distant reconstructed pixel is the nearest reconstructed pixel above the proximal reconstructed pixel in the first column having a plurality of reconstructed pixels proximally to the right available for prediction,
  identifying a plurality of distant right reconstructed pixels, wherein the plurality of distant right reconstructed pixels is the plurality of reconstructed pixels proximally to the right of the distant reconstructed pixel,
  generating, by a processor, a plurality of prediction pixels based on the proximal reconstructed pixel, the distant reconstructed pixel, and the plurality of distant right reconstructed pixels, and
  generating a plurality of predicted pixels for the second block based on the plurality of prediction pixels.

19. The method of claim 18, wherein each superblock in the plurality of superblocks respectively includes 64×64 pixels.

20. The method of claim 18, wherein generating the plurality of prediction pixels includes, for each prediction pixel in the plurality of prediction pixels, determining a difference between the distant reconstructed pixel and a sum of the proximal reconstructed pixel and a reconstructed pixel from the plurality of distant right reconstructed pixels corresponding to the respective prediction pixel.

\* \* \* \* \*